Nov. 19, 1929. G. F. HOCHRIEM 1,736,284
WEIGHING AND TICKET PRINTING MACHINE
Filed Sept. 14, 1926 16 Sheets-Sheet 1

Nov. 19, 1929.　　　G. F. HOCHRIEM　　　1,736,284
WEIGHING AND TICKET PRINTING MACHINE
Filed Sept. 14, 1926　　16 Sheets-Sheet 2

INVENTOR
Gustav F. Hochriem
BY
Pennie, Davis, Marvin & Edmonds
ATTORNEYS

Nov. 19, 1929.  G. F. HOCHRIEM  1,736,284
WEIGHING AND TICKET PRINTING MACHINE
Filed Sept. 14, 1926    16 Sheets-Sheet 3

INVENTOR
Gustav F. Hochriem
BY
Pennie, Davis, Marvin + Edmonds
ATTORNEYS

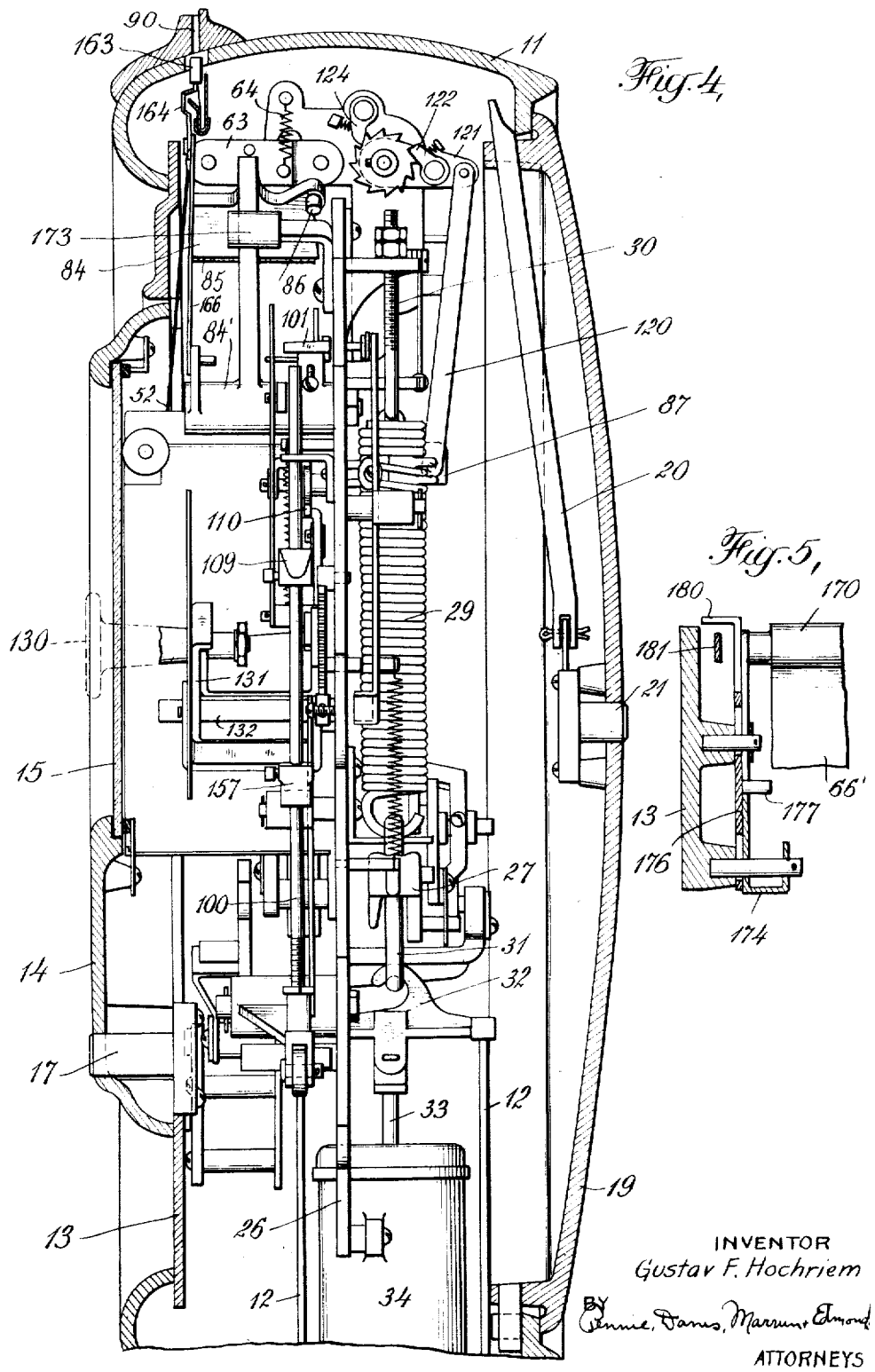

Nov. 19, 1929.　　　　G. F. HOCHRIEM　　　　1,736,284
WEIGHING AND TICKET PRINTING MACHINE
Filed Sept. 14, 1926　　16 Sheets-Sheet 5
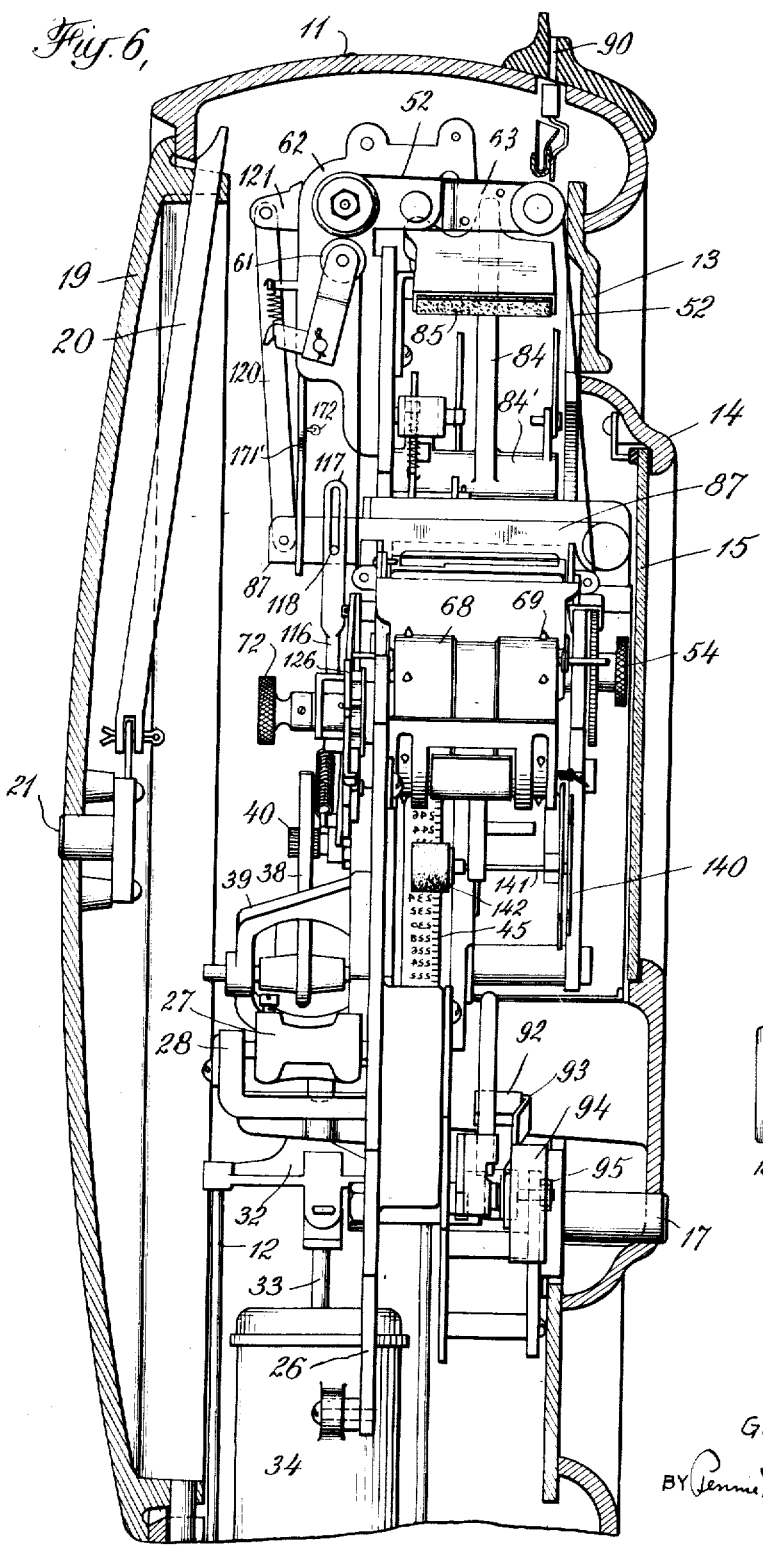
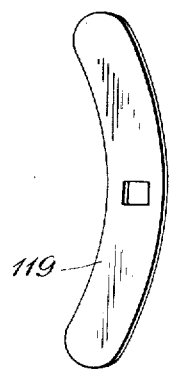
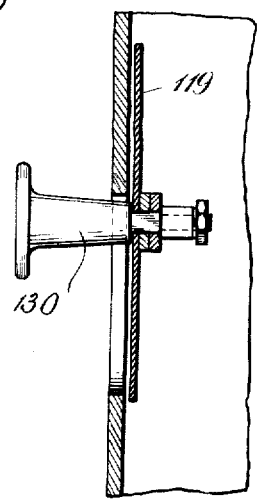
INVENTOR
Gustav F. Hochriem
BY Pennie, Davis, Marvin & Edmonds
ATTORNEYS

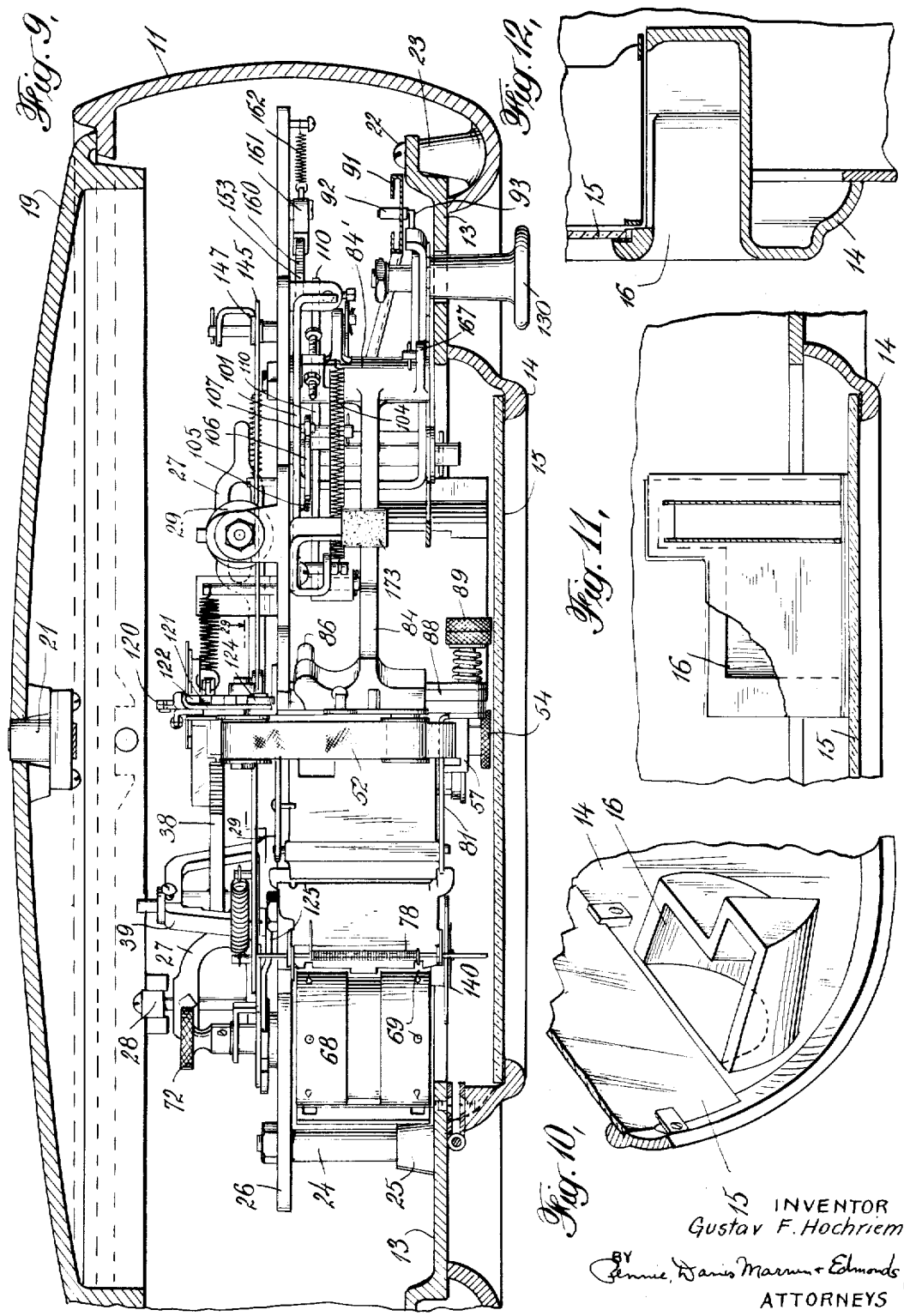

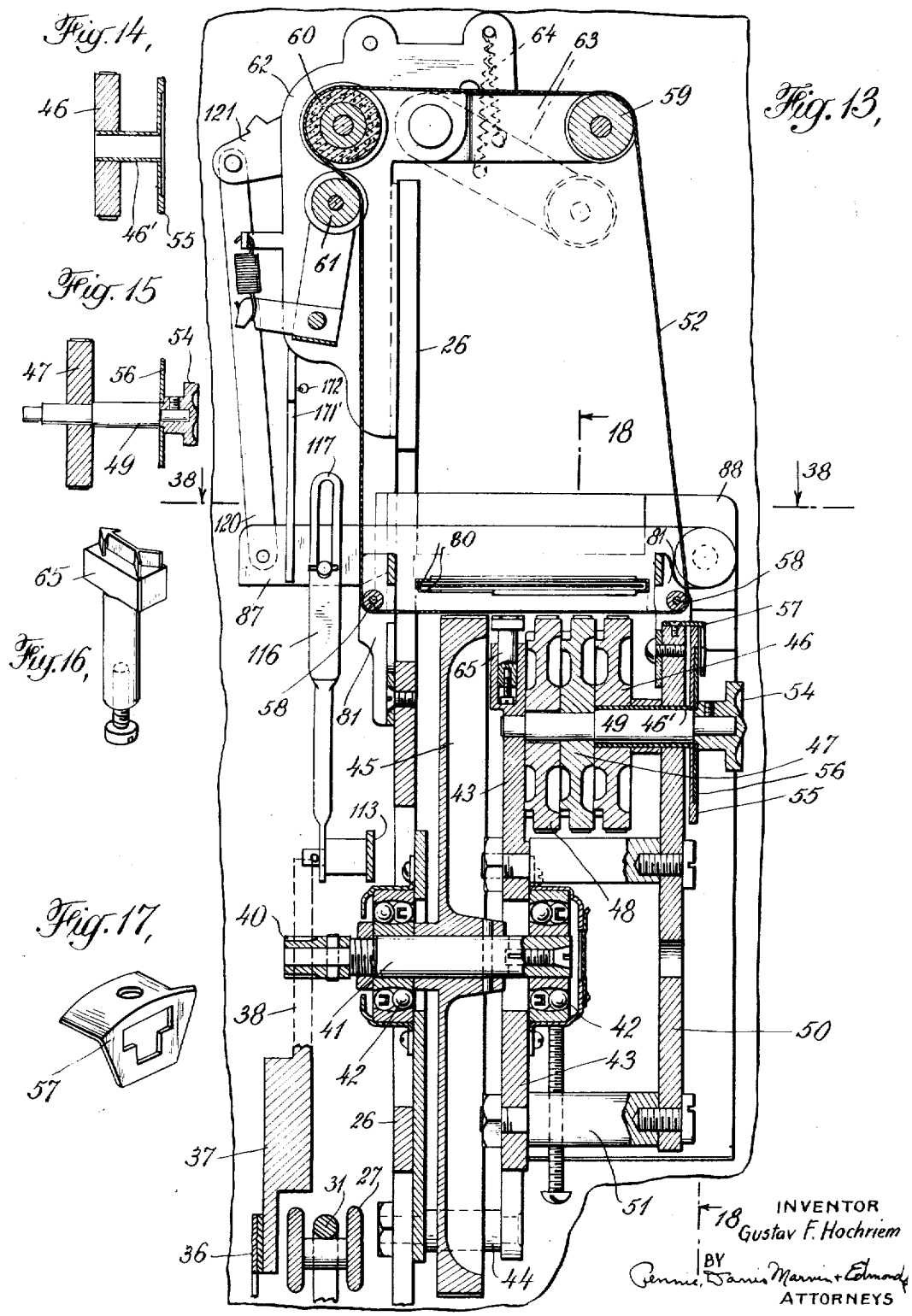

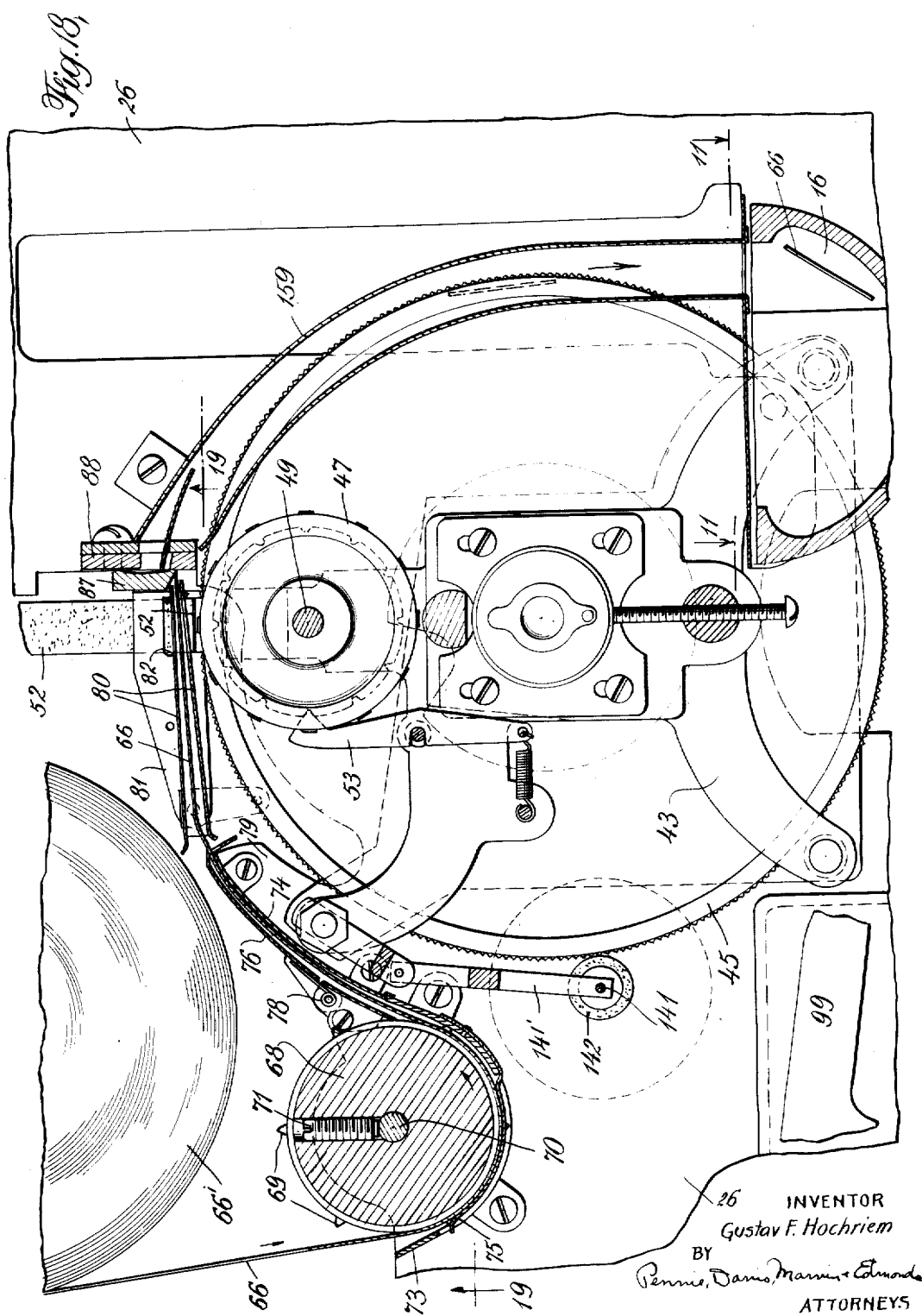

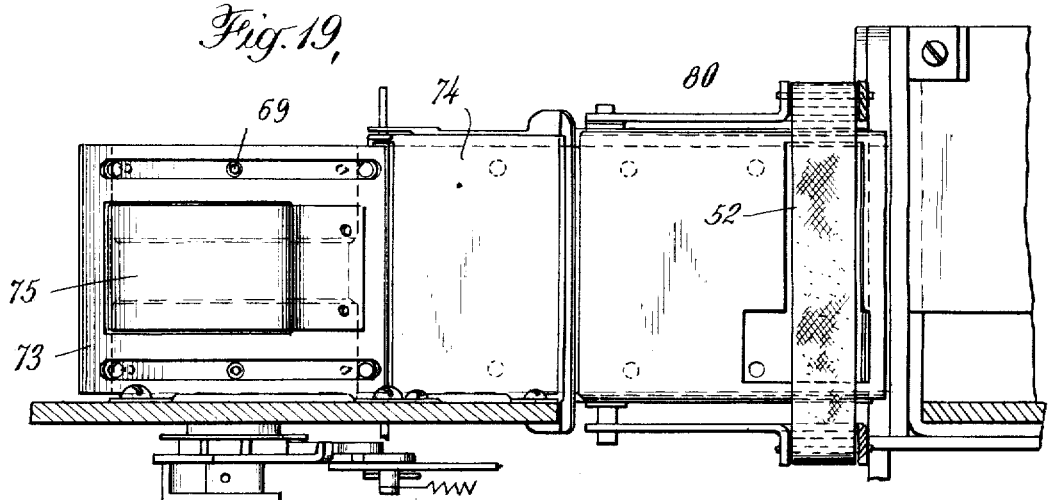
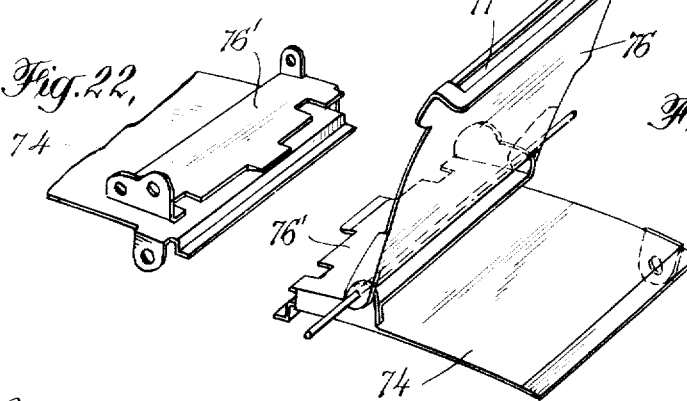
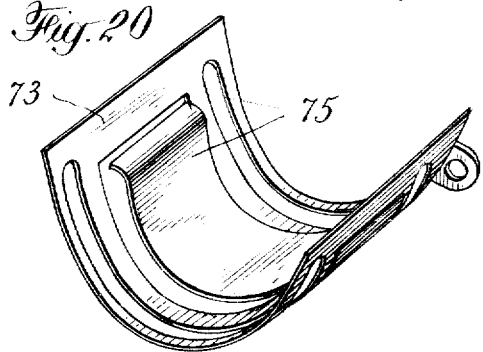

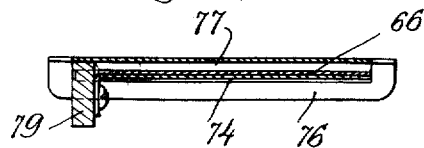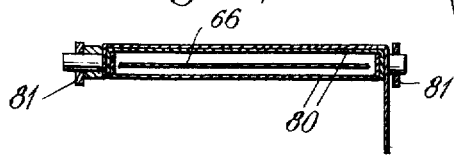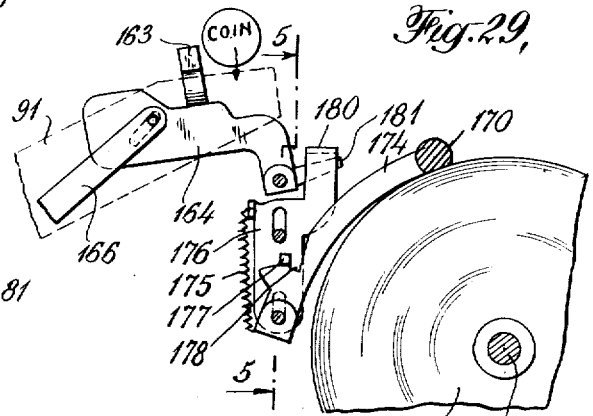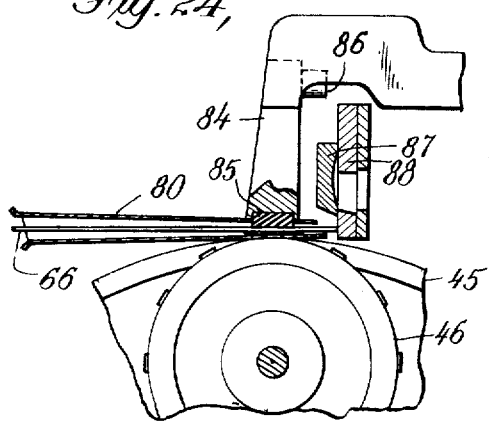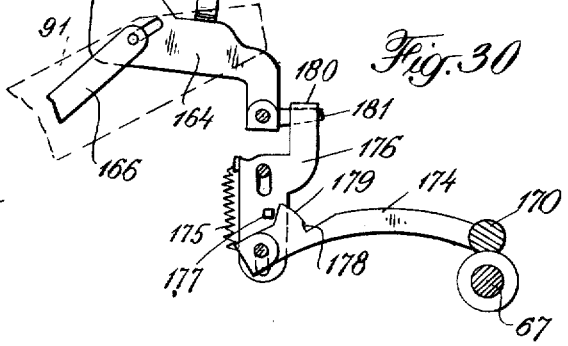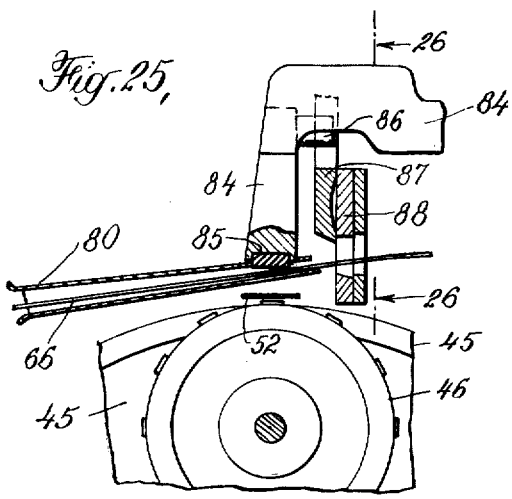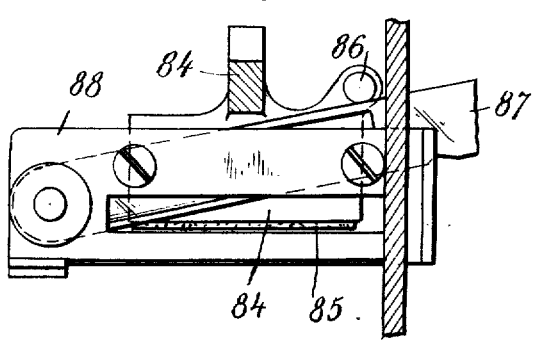

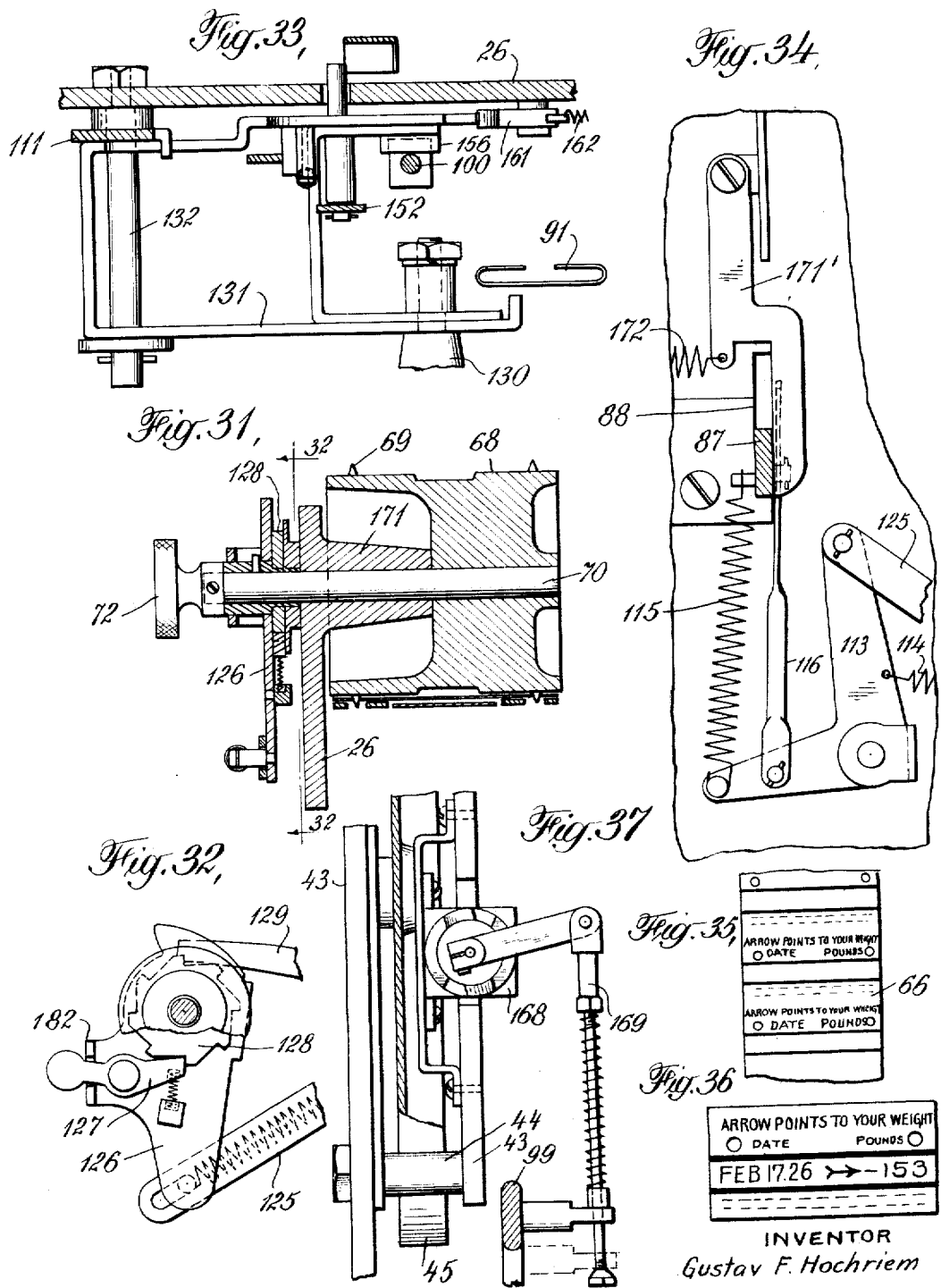

Nov. 19, 1929.   G. F. HOCHRIEM   1,736,284
WEIGHING AND TICKET PRINTING MACHINE
Filed Sept. 14, 1926   16 Sheets-Sheet 12
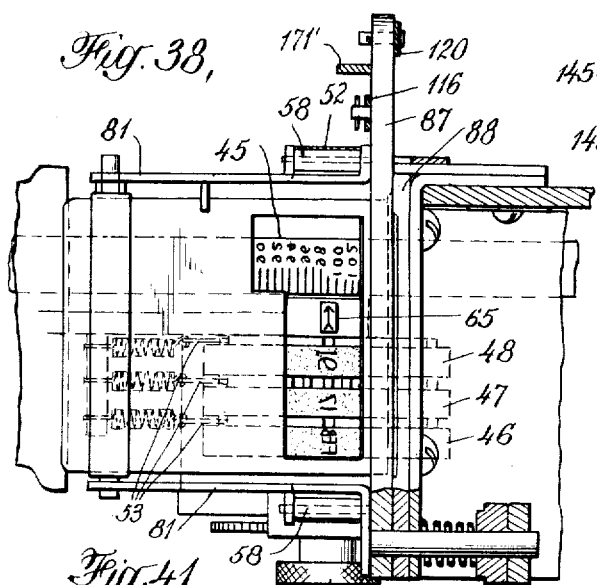
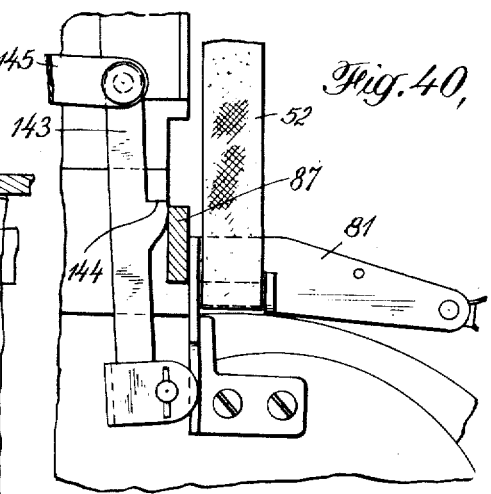
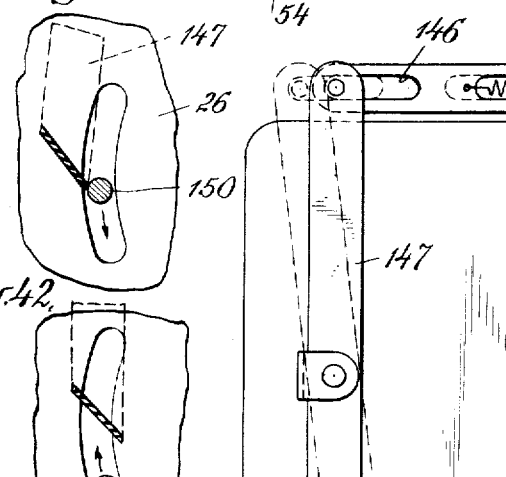
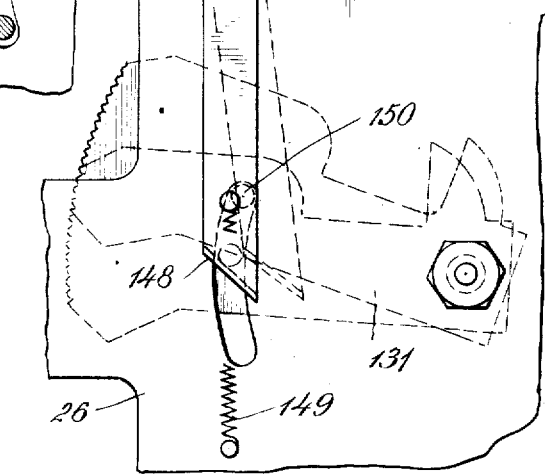
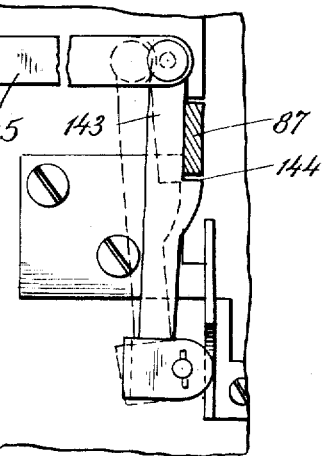
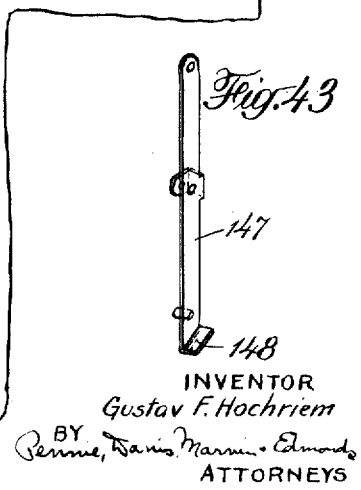
INVENTOR
Gustav F. Hochriem
BY Pennie, Davis, Marvin & Edmonds
ATTORNEYS Nov. 19, 1929.	G. F. HOCHRIEM	1,736,284
WEIGHING AND TICKET PRINTING MACHINE
Filed Sept. 14, 1926   16 Sheets-Sheet 13

INVENTOR
Gustav F. Hochriem
BY Pennie, Davis, Marvin & Edmonds
ATTORNEYS

Fig. 46.

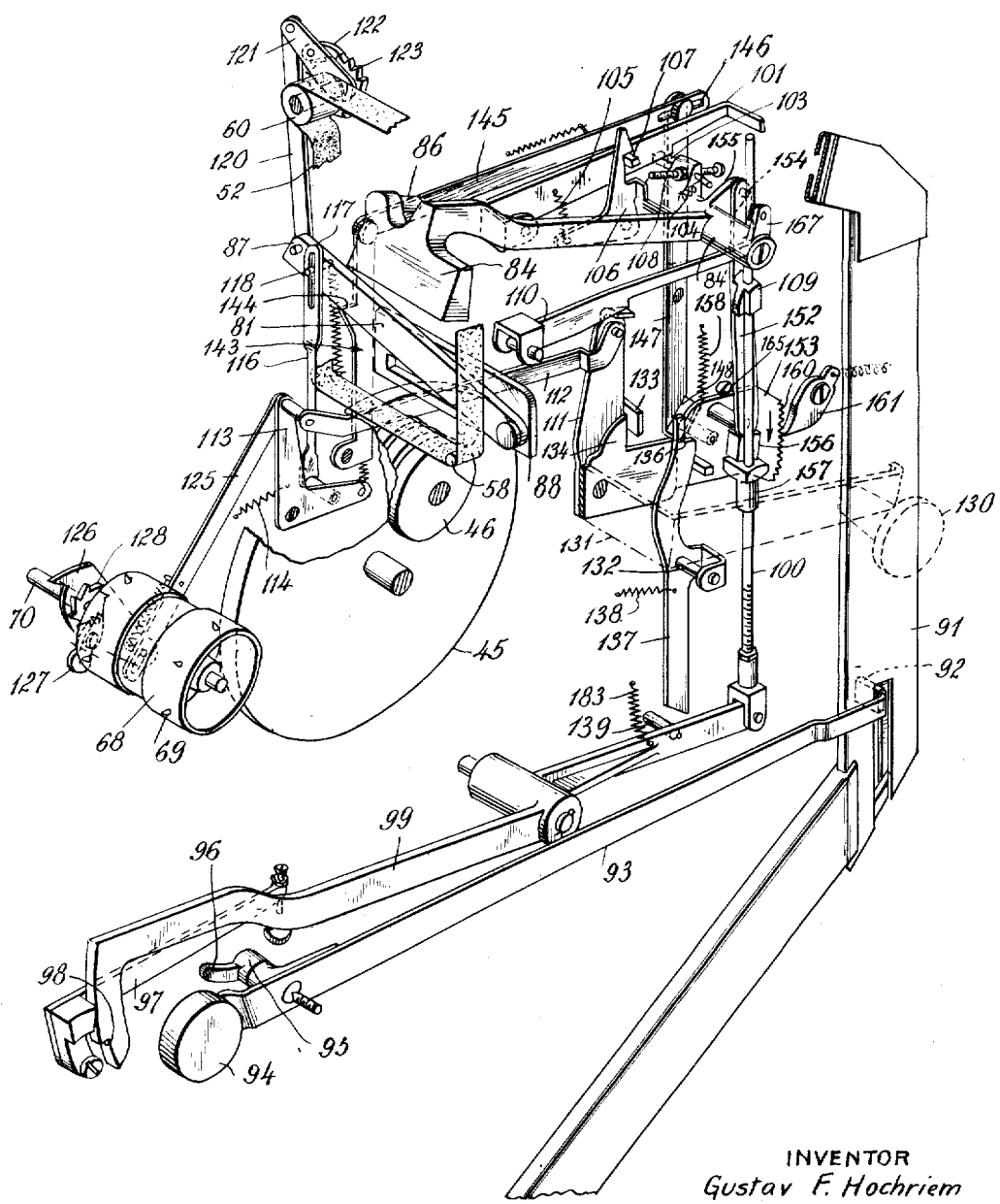

Patented Nov. 19, 1929

1,736,284

UNITED STATES PATENT OFFICE

GUSTAV F. HOCHRIEM, OF CHICAGO, ILLINOIS, ASSIGNOR TO RHODES-HOCHRIEM MANUFACTURING COMPANY, OF CHICAGO, ILLINOIS, A CORPORATION OF ILLINOIS

WEIGHING AND TICKET-PRINTING MACHINE

Application filed September 14, 1926. Serial No. 135,316.

This invention relates to weighing and ticket-printing machines and has for its object the provision of certain improvements in machines of this character. More particularly, the invention contemplates an improved weighing and ticket-printing machine of the coin-controlled type. The invention relates particularly to weighing machines which, upon the insertion of a coin, print and eject a ticket showing the weight of a person standing on the scale platform.

In the weighing and ticket-printing machines heretofore commonly used, a magazine of separate blank tickets, usually of cardboard, is provided and the tickets are fed into the printing position, printed and ejected one by one as persons to be weighed step upon the scale platform. In the improved machine of my present invention a continuous strip of blank tickets is provided, preferably in the form of a roll, and these blank tickets are advanced one by one into printing and then cutting positions, printed, cut off from the strip and ejected.

The improved weighing and ticket-printing machine of the invention comprises in general a weighing mechanism, a printing mechanism, a ticket-feeding mechanism, and a ticket cutting mechanism. The cooperative relations of these mechanisms in the preferred form of the machine are as follows: The person desiring to be weighed steps upon the scale platform and a printing wheel is thereby rotated into position for the printing of the weight of the person on an appropriate ticket. A continuous strip of tickets, appropriately rolled, is provided and the ticket-feeding mechanism feeds these tickets one by one into printing position. When the weighing mechanism has reached equilibrium (indicated by a small pointer in front of a disc), a coin is dropped in the coin slot. The falling coin sets in action the coin-controlled elements, whereby the hammer of the printing mechanism strikes the superimposed ticket, inked ribbon and printing wheel and effects the desired printing action on the ticket and an instant later the knife of the cutting mechanism is elevated and the hammer is withdrawn from contact with the printed ticket. Thereupon, the manually controlled elements are set in action by the pulling down of a knob or handle in front of the machine, whereby (1) the strip of tickets is advanced so that the printed ticket is in position to be cut off and the next adjacent ticket is in printing position, (2) the hammer is elevated to its uppermost position, (3) the inked ribbon is appropriately fed, (4) the knife descends and cuts off the printed ticket, and (5) the various tripping devices of the machine are restored to their initial positions ready for the next weighing and ticket-printing operation.

The foregoing and other improved features of the machine of the invention will be best understood from the following description taken in conjunction with the accompanying drawings in which:

Fig. 4 is an end elevation of the right-hand side of the machine with the casing in section, Fig. 5 is a detail view of the roll pressing against the roll of blank tickets, taken on the line 5—5 of Fig. 29.

Fig. 6 is an end elevation of the left-hand side of the machine with the casing in section.

Figs. 7 and 8 are detail views of (7) the knob for manipulating the coin-controlled elements and (8) the plate for closing the opening in the front plate through which the knob extends.

Fig. 9 is a top plan view of the machine with the casing in section.

Figs. 10, 11 and 12 are detail views of the ticket-receiving pocket in the front door frame of the machine.

Fig. 13 is an enlarged section taken on the section line 13—13 of Fig. 2.

Figs. 14 and 15 are detail views of the month and day printing-wheels.

Fig. 16 is a detail view of the arrow-printing member.

Fig. 17 is a perspective view of the bracket with the date-viewing window.

Fig. 18 is an enlarged section taken on the section line 18—18 of Fig. 13.

Fig. 19 is a detail plan, partly in section, of the ticket feeding means taken on the line 19—19 of Fig. 18.

Figs. 20, 21, 22 and 23 are detail perspective views of the guide plates for the ticket-feeding mechanism.

Figs. 24 and 25 are detail front elevations, partly in section, of certain elements of the printing and cutting mechanisms.

Fig. 26 is a detail end elevation of the cutting knife, partly in section, taken on the line 26—26 of Fig. 25.

Figure 1:
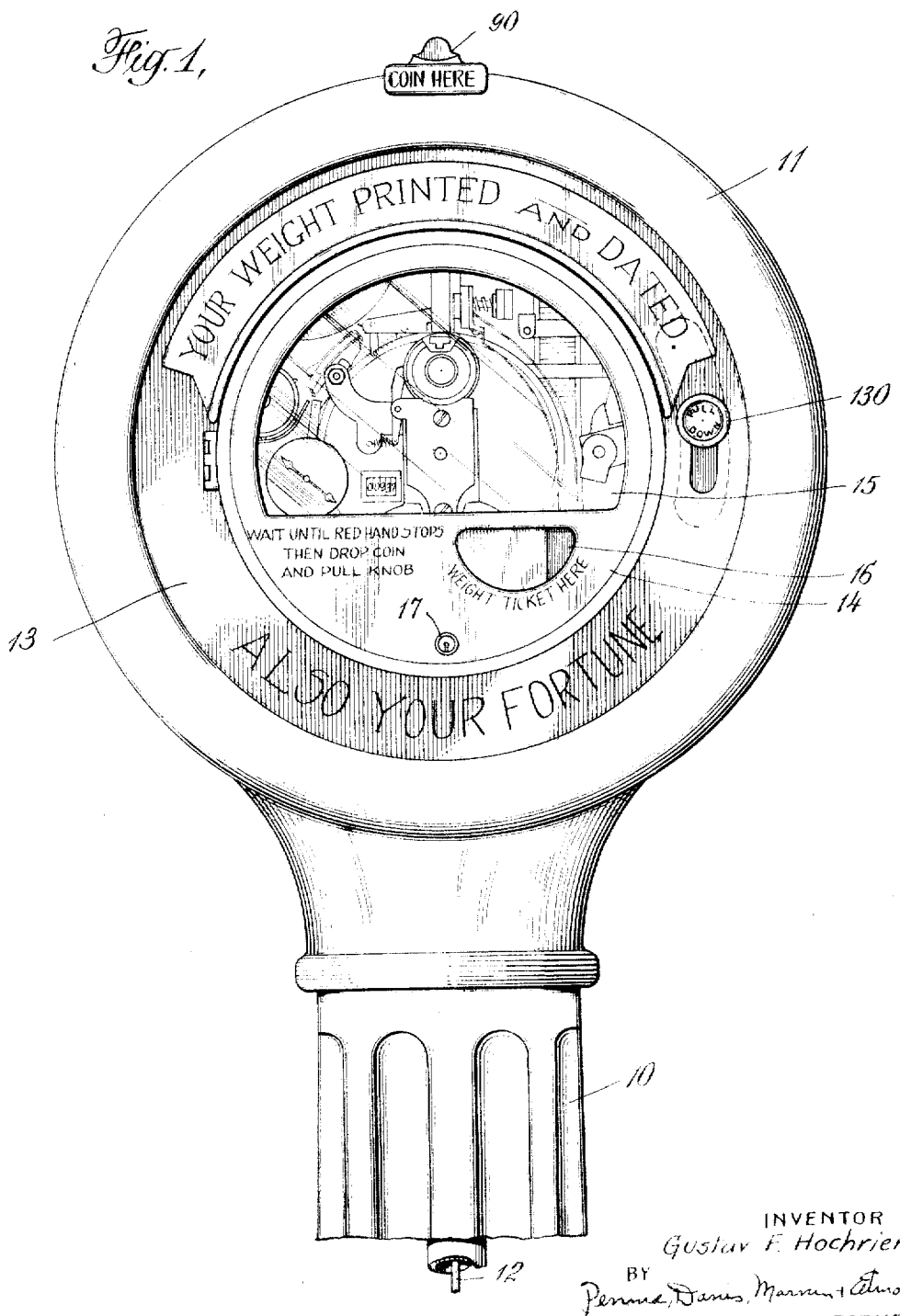
Fig. 1 is a front elevation of the upper portion of the machine.
Figure 2:
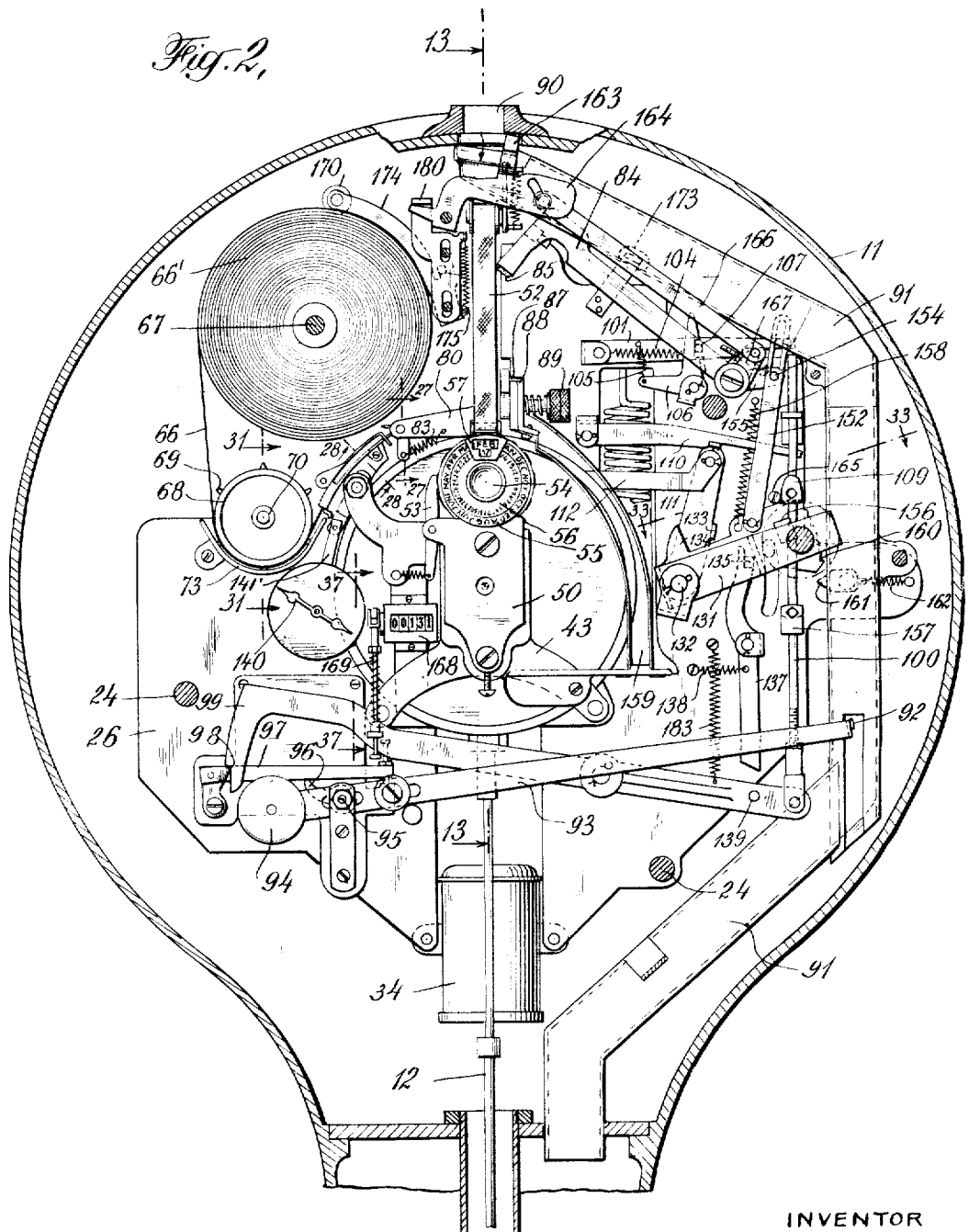
Fig. 2 is a front elevation of the machine with the casing removed.

Figs. 27 and 28 are detail sectional views of the ticket guide taken on the section lines 27—27 and 28—28, respectively, of Fig. 2.

Figs. 29 and 30 are detail views of the roll and mechanism for pressing against the ticket roll.

Fig. 31 is a sectional detail of the ticket drum driving means taken on the section line 31—31 of Fig. 2.

Fig. 32 is a detail view taken on the line 32—32 of Fig. 31,

Fig. 33 is a sectional view of the frame to which the manually moved knob is connected, taken on the line 33—33 of Fig. 2.

Fig. 34 is a detail rear elevation of the knife-actuating means.

Fig. 35 is a view of the ticket strip.

Fig. 36 is a view of a printed and cut-off ticket.

Fig. 37 is a detail end elevation of the metering attachment taken on the line 37—37 of Fig. 2, Fig. 38 is a detail plan, partly in section, of the printing wheels, taken on the line 38—38 of Fig. 13.

Figs. 39, 40, 41, 42 and 43 are detail views of the latching device for holding the knife in elevated position, and Figs. 44, 45, 46 and 47 are explanatory perspective views illustrating various operating positions of the coin-controlled and manually-controlled elements.

The machine comprises the usual base and scale platform (not shown). A hollow vertical pedestal 10 is mounted on the base and carries at its upper end a housing 11, for the operating mechanisms. The scale platform is operatively connected to a vertically movable rod 12 positioned within the pedestal, and the movement of this rod, when a person steps upon the scale platform, operates the weighing mechanism.

The front of the housing 11 is closed by an annular plate 13 to which is hinged a door frame 14 carrying a glass window 15. The frame 14 has a recessed pocket 16 for the reception of the printed tickets delivered by the machine, and is provided with a lock 17 for securing the door closed. The back of the housing is closed by a door 19 adapted to be locked in position by a locking lever 20 manipulated by a lock 21.

The annular plate 13 is secured to the housing by screws or bolts 22 engaging bosses 23 integral with or otherwise appropriately attached to the housing (see Fig. 9). Spacing members 24 are secured to lugs 25 on the back of the annular plate 13, and a rear plate 26 is bolted to the inner extremities of these spacing members. The two plates 13 and 26 support the elements of the operating mechanisms as hereinafter more particularly described.

The weighing mechanism (see particularly Fig. 3) comprises a scale beam 27 supported at one end by knife bearings 28 and secured at the other end to the lower end of a spring 29. The upper end of the spring 29 is adjustably secured to a bracket 29 (on the plate 26) by means of a hooked-bolt 30. A link 31 is loosely carried by the beam 27 intermediate its ends. A yoke 32 is hooked to the link 31 (see Figs. 4 and 6). The vertical rod 12 is secured to this yoke as is also the rod 33 or a dash pot 34 bolted to the lower extremities of the plate 26 (see Figs. 2, 3, 4 and 6). These elements constitute a spring scale in which the movement of the beam 27 (from its initial or zero position) is proportional to the weight of the person standing on the scale platform. The initial or zero position of the beam 27 is determined by the engagement of an adjustable screw 27' (on the beam) with a stationary lug 27" (on the plate 26).

Figure 3:
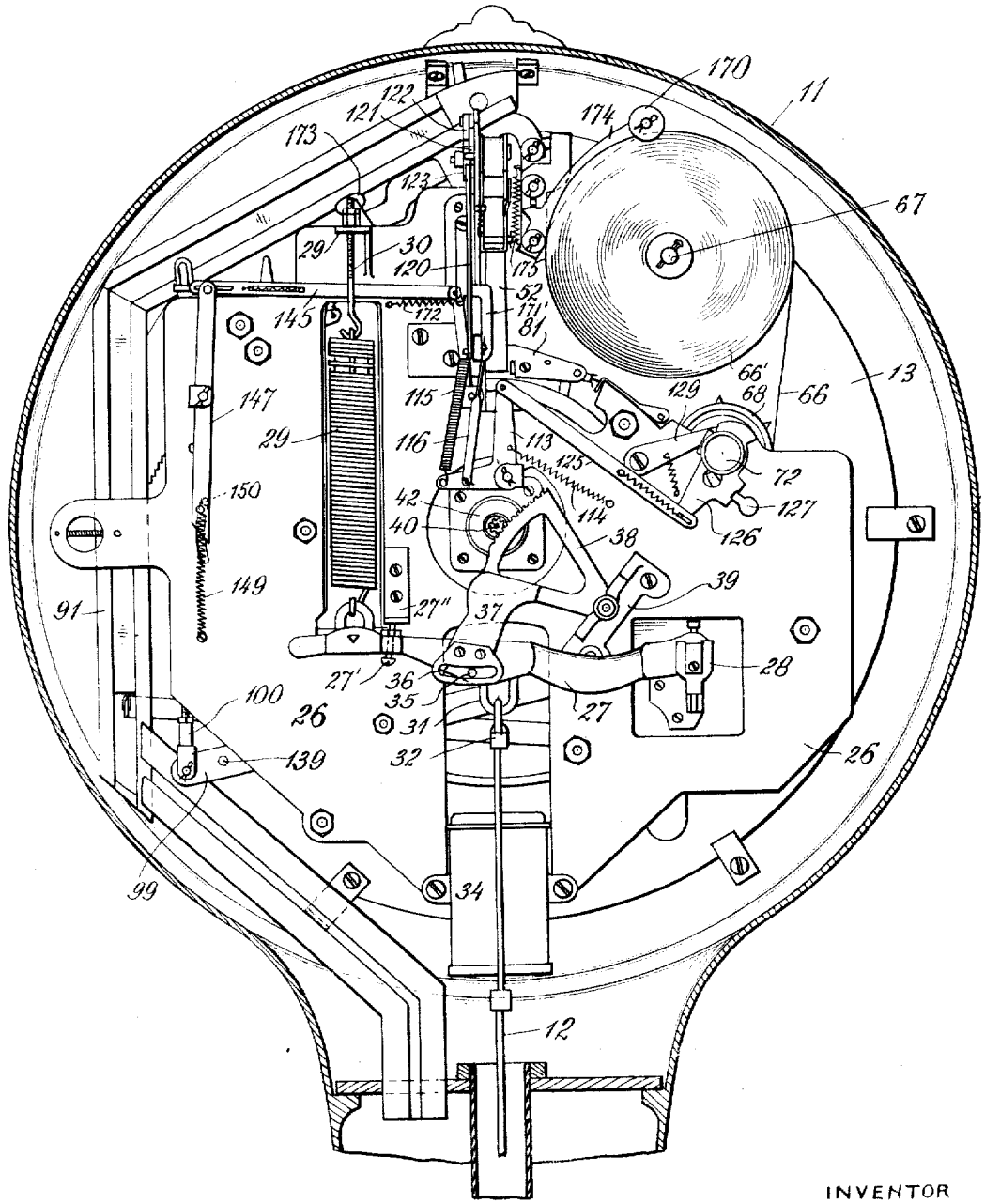
Fig. 3 is a rear elevation of the machine with the back removed.

The scale beam 27 carries a pin 35 registering with the slot in a plate 36 secured to a bracket 37 of a sector-shaped gear member 38 (see Fig. 3). The member 38 is pivotally mounted in a yoke 39 secured to the rear plate 26, and its gear teeth mesh with a pinion 40 secured to a shaft 41.

The shaft 41 is horizontally mounted in adjustable ball-bearings 42 carried by the rear plate 26 and a bracket 43 secured to the rear plate by bolts 44 (see Fig. 13). A printing wheel or disc 45 is secured to the shaft 41, intermediate the ball bearings. The periphery of the wheel 45 is provided with raised figures indicating pounds, usually running from "20" to "300". When the person to be weighed steps on the scale platform, the printing wheel 45 is rotated (by the pinion 40, sector-shaped gear member 38, slotted plate 36 and scale-beam pin 35) until the figure on the periphery of the wheel corresponding to the weight of the person is uppermost and in proper printing position.

Three small printing wheels 46, 47 and 48 are mounted on a shaft 49 in front of the printing wheel 45. The peripheries of these small wheels 46, 47 and 48 are provided with figures or legends for printing the month, day and year, respectively. The shaft 49 is mounted between the bracket 43 and a front plate 50 secured to the bracket by spacing bolts 51. The uppermost peripheral surfaces of the four printing wheels 45, 46, 47 and 48 are in the same horizontal and vertical planes and directly beneath an endless inked ribbon 52 (see Figs. 13 and 38). A printing arrow 65 is adjustably mounted in the top of the bracket 43 in the same horizontal and vertical planes as the four printing wheels (see Figs. 13, 16 and 38).

Each of the dating wheels 46, 47 and 48 is provided with a ratchet and a cooperating spring actuated pawl 53 for holding the wheels in adjusted position (see Figs. 2 and 38). The year wheel 48 is loosely mounted on the shaft 49 and is manually set or adjusted for the appropriate year. The day wheel 47 is secured to the shaft 49 and is adapted to be manually set or adjusted by a knurled knob 54 secured to the outer end of the shaft 49 (see Figs. 13 and 15). The month wheel 46 is secured to a sleeve 46' loosely mounted on the shaft 49 and is adapted to be set or adjusted by an knurled annular plate 55 secured to the outer end of the sleeve (see Figs. 13 and 14). The knob 54 carries a disc 56 concentrically positioned within a circular recess of the plate 55. The outer face of the disc 56 carries numbers 1 to 31, indicating the day of the month, and the outer face of the plate 55 carries legends indicating the month (see Fig. 2). The figure and legend appearing through the opening of a plate 57 (secured to the top of the front plate 50) indicate the day and month for which the wheels 47 and 46 are respectively adjusted or set in printing position (see Figs. 2, 13 and 17).

The endless inked ribbon 52 passes around lower guide rollers 58 (mounted in brackets 81; see Figs. 13 and 38) and an upper guide roller 59 and inking roller 60. A spring-actuated tension roller 61 serves to keep the ribbon taut. The inking roller 60 is mounted on a bracket 62 secured to the rear plate 26 and is periodically moved by the ticket-feeding mechanism as hereinafter more fully described. The upper guide roller 59 is mounted on an arm 63 pivoted to the bracket 62 and held in horizontal position against the bracket by a spring 64. The arm 63 can be depressed (dotted line position Fig. 13) for removal of the ribbon.

A continuous strip of blank tickets 66 is formed into a roll 66' rotatably mounted on a spindle 67. A spring actuated guide 170 bears against the upper surface of the roll 66'. The strip of tickets passes from the roll 66' to a drum 68. The cylindrical surfaces of the drum is provided (near each end) with spaced spikes 69 that register with corresponding spaced apertures near each side of the ticket strip. The ticket strip may initially contain any appropriate number of blank tickets, usually about 2000. Each blank ticket may have any desired printing thereon with appropriate blank spaces for the printing by the machine of the weight and date (see Figs. 35 and 36.)

The drum 68 is secured to a shaft 70 by a set screw 71. The shaft 70 is rotatably journalled in a boss 171 integral with the plate 26 and has a knurled knob 72 secured to its inner end (see Fig. 31).

The strip of blank tickets passes around the lower surface of the drum 68 and over curved guide plates 73 and 74 secured to the front face of the rear plate 26 (see Figs. 18, 19, 20, 21 and 22). The guide plate 73 surrounds the lower cylindrical surface of the drum and has a spring tongue 75 riveted thereto. The ticket strip passes between the drum and the guide plate 73 and is pressed against the drum by the tongue 75.

The guide plate 74 is also secured to the rear plate 26 and is provided with upwardly turned flanges in which is pivoted an upper guide plate 76 having a slot 77 at its forward end. A plate 76' is secured to the plate 74 in spaced relation with the rear top surface thereof. The rear end of the plate 76' is notched to conform with the central recess and spikes on the cylindrical surface of the drum 68 (see Figs. 21 and 22). The ticket strip passes between the plates 74 and 76, through the space between the plates 76 and 76' and through the slot 77. A coiled spring 78 presses the plate 76 against a lug 79 integral with the rear plate 26.

A pair of superposed guide plates 80 is pivoted to a pair of brackets 81 secured respectively to the rear plate 26 and the front plate 50. The plates 80 have registering openings 82 at their forward end for permitting printing of the ticket. The ticket strip passes between the plates 80 and terminates at its outer end with the first blank ticket thereon properly positioned above the ribbon for the printing operation. A spring 83 normally holds the plates 80 in an upper position to maintain the ticket (in printing position) out of contact (see Fig. 2) with the ribbon.

A printing hammer 84 has its hub 84' appropriately journalled between the plates 13 and 26. The face of the hammer head has an impact member 85 of rubber, leather, or the like. The hammer head is provided with a pin 86 adapted to engage the upper edge of a cutting knife 87. The knife is operatively pivoted at the forward end of a stationary bracket 88 (secured to the rear plate 26) by an adjustable tension bolt 89.

A coin slot 90 is mounted on the top of the housing 11 and communicates with a coin passage 91 within the housing. The inwardly turned end 92 of a tripping lever 93 extends into the lower end of the coin passage 91 and is adapted to be struck by the falling coin thereby tripping and actuating the coin-controlled mechanisms of the machine.

The tripping lever 93 has a counterweight 94 and is adjustably secured to a journalled member 95 whereby the tripping lever may be nicely balanced. A dog 96 is secured to the member 95 and is adapted to strike and trip a pivoted catch 97 engaging a shoulder 98 of a lever arm 99. The lever arm 99 is journalled on the front of the rear plate 26 intermediate its tripping and actuating ends. A vertically disposed rod 100 (appropriately guided) is pivoted to the actuating end of the arm 99.

A tripping catch 101 is positioned in the path of movement of the upper end of the rod 100. A shoulder 102 on this catch engages a lug 103 on the hammer hub 84' and thereby holds the hammer in elevated position. When the catch 101 is released by the rod 100, the hammer descends by the combined action of gravity and of a coiled spring 104.

Figure 44:
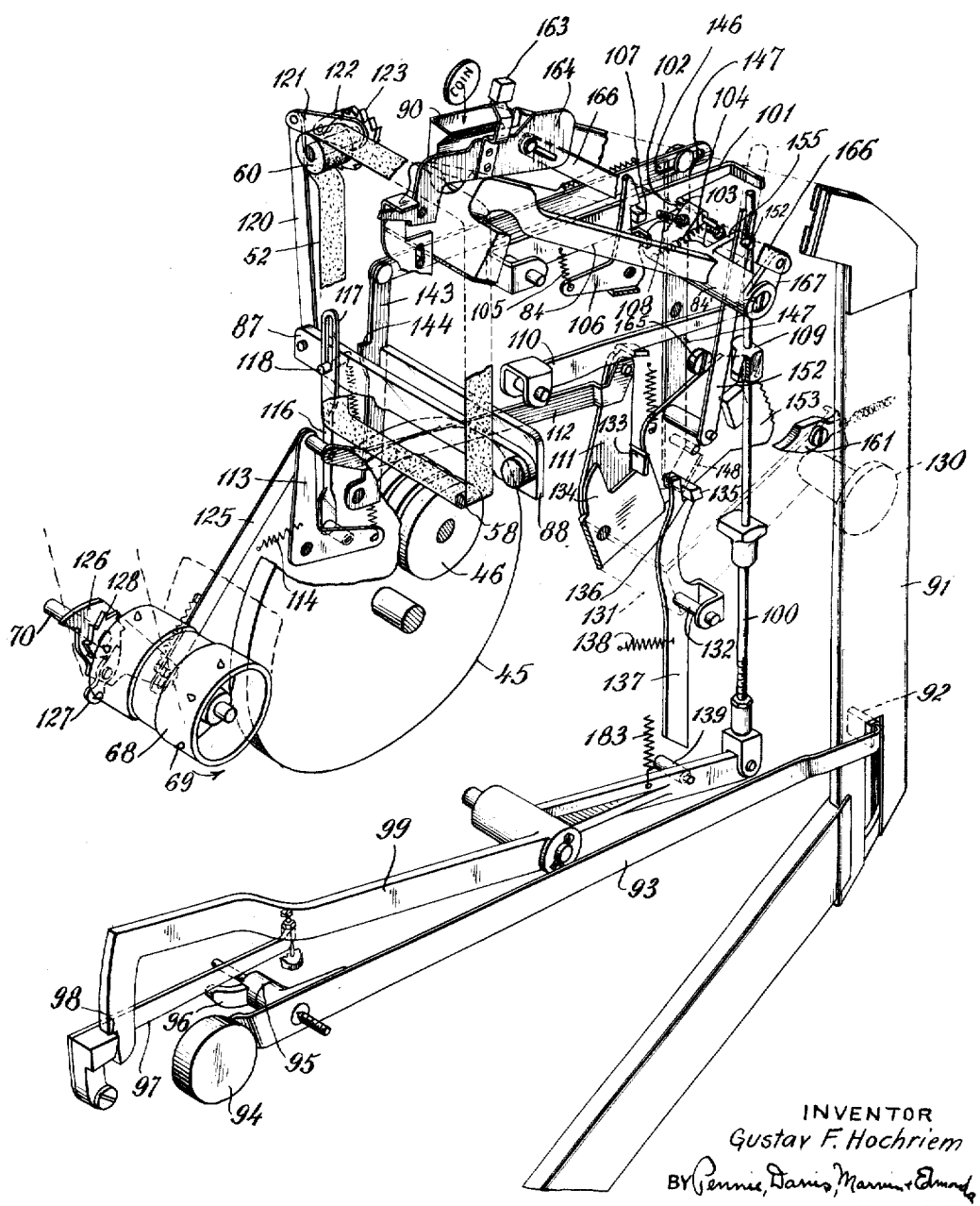

A coiled spring 105 is secured between the catch 101 and one arm of a pivoted bell crank lever 106 (see Figs. 2 and 44). The other arm of the lever 106 has a shoulder adapted to engage a pin 107 on the catch 101 when the catch is tripped by the rod 100. The catch is thereby held stationary and further upward movement of the rod 100 is momentarily delayed to allow the hammer to descend to almost its ticket-impacting position. At this instant, an adjustable pin 108 on the hammer hub 84' engages a projection on the bell crank lever 106 to move the shoulder of the lever out of engagement with the pin 107, whereupon the rod 100 is free to continue its upward movement. This delayed action in the upward movement of the rod 100 is necessary to permit time for the hammer to descend before the knife-elevating device is tripped.

The resumed upward movement of the coin-controlled vertical rod 100 actuates the mechanism for elevating the knife 87. A dog 109 is adjustably secured to the rod 100 so as to strike a tripping lever 110 an instant after the rod has resumed its upward movement.

The lever 110 (pivoted to the rear plate 26) has a shoulder engaging a lug on a pivoted arm 111. A link 112 connects the arm 111 to one arm of a bell crank lever 113 positioned behind the rear plate 26. A coiled spring 114 tends to move the lever 113 in a clockwise direction as viewed from the back of the machine (see Fig. 3). A vertically disposed rod 116, having a slotted head 117, is pivoted to one arm of the lever 113 and is moved upwardly when the lever is moved clockwise by the action of the spring 114. A pin 118, secured to the knife 87, is operatively positioned in the slotted head 117, and the upward movement of the rod 116 elevates the knife to its initial cutting position and temporarily molds it there. The rear end of the knife is firmly held against the bracket 88 by a guide 171' and cooperating spring 172 (Fig. 34).

Figure 45:
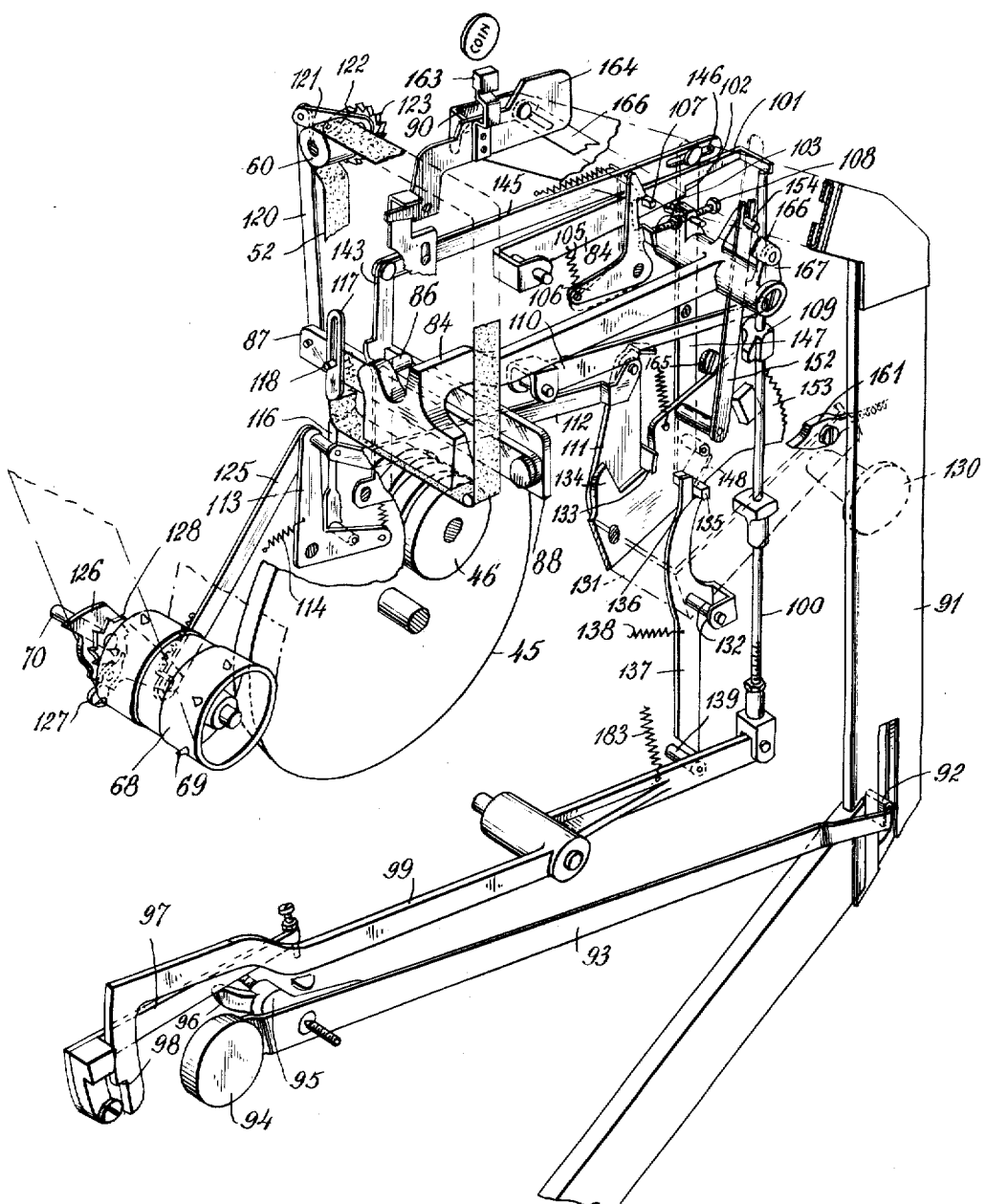

A link 120 is connected between the knife 87 and a pivoted arm 121 carrying a spring-pressed pawl 122 (see Figs. 4, 13 and 45). The pawl 122 engages a ratchet 123 secured to the inking roller 60, and elevation of the knife thereby effects predetermined movements of the ratchet, inking roller and printing ribbon. A spring-pressed holding pawl 124 also engages the ratchet 123.

A link 125 is operatively connected between one arm of the bell crank lever 113 and an arm 126, loosely mounted on the shaft 70 of the ticket-feeding drum 68 (see Figs. 3, 32 and 44). The arm 126 carries a spring-pressed pawl 127 operatively engaging a ratchet 128 secured to the shaft 70 of the drum 68. A spring-actuated holding pawl 129 also engages the ratchet 128.

A knob or handle 130 extends outwardly from the face of the machine through a slot in the plate 13 and its manipulation actuates the manually-controlled mechanisms. A sector-shaped plate 119 is secured to the knob behind the plate 13 for closing the slot in the plate through which the knob extends. The knob 130 is secured to a frame 131 pivoted on a shaft 132 secured to the rear plate 26 (see Fig. 33). The arm 111 is also pivoted on the shaft 132 and is provided with a lug 133 adapted to be engaged by a dog 134 on the frame 131 (see Figs. 2 and 44).

Normally, the knob 130 is restrained from downward movement by a lug 135, secured to the frame 131, cooperating with a shoulder 136 on a pivoted arm 137. A coiled spring 138 biases the arm 137 to its holding position. A pin 139 on the actuating end of the lever arm 99 engages the lower beveled edge of the arm 137, when the coin-controlled mechanism is operated, and moves the shoulder 136 out of the downward path of movement of the lug 135. By this arrangement the knob 130 is locked against movement until a coin is dropped into the machine.

The remaining features of construction of the machine will be explained in connection with the following description of the operation.

The dating wheels 46, 47 and 48 are manually adjusted each day to print the correct date on the ticket. The person desiring to be weighed steps on the scale platform and the printing wheel rotates until the figure corresponding to the person's weight is in the printing position. Equilibrium of the weighing mechanism is indicated by a pointer 140 of characteristic color carried by a shaft 141 to which is secured a rubber roller 142 engaging the periphery of the weight printing wheel 45 (see Figs. 2, 6 and 18). The shaft 141 is rotatably mounted in a depending arm 141' positioned to give the desired frictional engagement between the roller 142 and the printing wheel 45. When the wheel ceases to oscillate the pointer 140 will come to rest.

The operating mechanisms are now in the position indicated in Fig. 44 of the drawings. A coin is now dropped in the slot 90 and falling through the passage 91 strikes and trips the lever 93, thereby unlatching the lever arm 99. The actuating end of the lever arm 99 is now pulled up by a spring 183 and the vertical rod 100 then moves upwardly and strikes the hammer tripping catch 101 and the impact member 85 of the hammer strikes the first blank ticket on the ticket strip. The inked ribbon is interposed between the uppermost surfaces of the printing wheels and the blank ticket and the impact from the hammer prints on the ticket the date, two or perhaps three figures and an arrow pointing to the correct figure of weight.

While the hammer is falling, upward movement of the rod 100 is momentarily retarded by the engagement of the pin 107 with the shoulder on the lever 106, whereby the rod 100 is held by the now relatively stationary catch 101. The lever 106 is biased to this position by the spring 105. The relative positions of the operating elements of the machine at this instant are indicated by Fig. 45 of the drawings.

When the hammer has just about completed its descent, the pin 108 on the hub 84' engages the projection on the lever 106 and pushes the lever away from the pin 107, whereby the rod 100 is permitted to complete its upward movement.

As the rod 100 now continues its upward movement, the dog 109 strikes and trips the lever 110, whereupon the coiled spring 114 actuates the bell crank lever 113 in a counter clockwise direction as viewed in Figs. 44—47, thereby elevating the knife 87 by means of the slotted rod 116. At the same time, the hammer 84 is slightly raised by the engagement of the pin 86 with the knife 87 as the latter is elevated. By this means the action of the hammer is a rapid impact with a substantially instantaneous withdrawal from contact with the ticket whereby a clear impression is produced (printed) on the ticket. The operating elements are now in the positions indicated in Fig. 46 of the drawings.

The knob 130 is next pulled down, the lug 133 being now in contact with the dog 134. The dog 134 moves the arm 111, and link 112 to turn the bell crank lever 113 in a clockwise direction as viewed in Figs. 44—47. Simultaneously the link 125 moves the arm 126 and the pawl 127 engages the ratchet 128 and rotates the ticket-feeding drum through an angle corresponding to the width of one ticket. The printed ticket is thereby advanced into position to be cut off the strip by the knife, and the next adjacent ticket is brought into printing position.

During the downward movement of the knob 130, the knife 87 is held in its elevated position by a vertically disposed arm 143 having a shoulder 144 that engages the lower edge of the knife, as the rod 116 is lowered from its former knife-supporting position (see Figs. 39—43). With the knife so held in its elevated position, movement of the lever 113 by the manually controlled knob 130 energizes the spring 115, connected between the knife and the lever. The upper end of the arm 143 is connected to one end of a horizontally disposed link 145. The other end of the link has a slot 146 in which the upper end of a vertically disposed arm 147 is loosely mounted. The arm 143 is normally urged towards its knife-supporting position by a coiled spring 143' secured at one end to the link 145 and at its other end to the back of the plate 26. The arm 147 is pivoted intermediate its ends on the back of the rear plate 26 and at its lower extremity has an inclined flange 148. The arm is biased to its normal vertical position by a spring 149. A pin 150, secured on the back of the frame 131 and extending through a slot in the rear plate 26, engages the upper surface of the flange 148 as the knob 130 is pulled down (see Fig. 41), whereby the arm 147 swings idly in its slotted connection with the link 145, and the supporting of the knife by the arm 143 is undisturbed.

The downward movement of the knob 130 also raises the hammer 84 to its elevated position. This is accomplished by a link 152 pivoted at its lower end to a plate 153 secured to the frame 131. The upper end of the link 152 is slotted and is engaged by a pin 154 secured to a crank arm 155 integral with the hammer hub 84'. As the knob is pulled down, the link 152 and crank arm 154 raise the hammer to its elevated position where it is caught and held by the catch 101. Overthrow of the hammer during its elevation is prevented by a fixed stop 173.

Downward movement of the knob 130 further restores the coin-controlled mechanisms to their initial positions. Thus, a lug 156 secured to the frame 131 engages a dog 157 adjustably secured to the vertical rod 100, and as the handle is pulled down the lug forces the rod down until the shoulder 98 of the lever arm 99 has been caught and held by the catch 97. Fig. 47 of the drawings indicates the relative positions of the elements when the knob has completed about one-half of its downward movement.

The knob 130 is now in its lowermost position and is released by the person on the scale platform. Thereupon a spring 158, secured between the frame 131 and the rear plate 26, returns the knob to its initial or upper position, determined when the plate 153 engages a stationary pin 165 on the front of the rear plate 26. As the knob moves upward, the pin 150 (see Fig. 42) engages the lower surface of the flange 148 and the arm 143 is thereby moved out of its knife-supporting position to the dotted line positions of Fig. 39. The knife is thereupon pulled down by the spring 115 with a cutting action and the printed ticket is cut off and falls through a discharge chute 159 to the ticket pocket 16 in the lower half of the door frame 14 (see Fig. 18).

The machine is now restored to its initial condition ready for the next weighing and ticket-printing operation.

Reverse movement of the knob 130, during its normal downward and during its normal return movements, is prevented by serrations or teeth 160 on the outer periphery of the plate 153, secured to the frame 131. A pawl 161, biased to a horizontal position by a spring 162, engages the teeth 160, and prevents reverse or backward motion of the knob 130 and cooperating elements during either of the normal movements of the knob.

Upon the dropping of a coin into the machine and the subsequent operation of the coin-controlled mechanism, the coin slot 90 is closed by a plug 163 carried by a pivoted plate 164. The plate 164 is operatively connected by a link 166 to a crank 167 on the hammer hub 84' (see Figs. 2 and 44). So long as the hammer occupies its elevated position, the plug 163, actuated by gravity, occupies an inoperative position. Upon the descent of the hammer and until it is finally raised again the plug 163 is held in its slot-closing position by the link 166 and cooperating elements.

A meter 168 for registering the number of weighing and ticket-printing operations performed by the machine is mounted on the bracket 43. The meter is operated by a linkage 169, operatively connected to the lever arm 99 (see Fig. 37), when the knob is pulled down and the lever arm 99 restored to its initial or latched position.

The paper roll guide 170 (Figs. 5, 29 and 30) is carried by a pivoted arm 174 and is biased towards the paper roll by a spring 175. The spring 175 is secured between the arm 174 and a plate 176 mounted to permit a slight vertical movement. When a new roll of tickets is being placed in the machine, the arm 174 is held in an elevated position, and out of the way, by a pin 177, on the arm 174, engaging a notch 178 in the arm. When the roll of tickets has been used up, the shoulder 179 of the arm 174 passes from beneath the pin 177 and the spring 175 pulls the plate 176 down. The plate 176 has a flanged extension 180 adapted to engage a finger 181, secured to the coin slot closing plate 164, when the plate 176 is pulled down, whereby the coin slot is closed by the plug 163 to indicate that the blank tickets in the machine are exhausted.

When a new roll of tickets is to be put into the machine the coin-controlled mechanisms are first tripped. The plate 126 of the drum driving mechanism is thereby moved back as hereinbefore described. In this backward position of the plate 126, the pawl 127 is held out of engagement with the ratchet 128 by a lug 182 on the plate (see Fig. 32). The drum can now be turned in a forward direction by the knob 72 for the purpose of feeding the new strip of tickets through the ticket guides into operative printing position. When the manually controlled mechanisms are operated, the pawl 127 engages one of the teeth of the ratchet 128 and drives the drum forward as hereinbefore described.

The manually manipulated knob 130 is normally locked against downward movement by the engagement of the lug 135 with the shoulder 136 of the arm 137 (see Figs. 44 and 45). As the coin-controlled elements complete their actions, the pin 139 on the lever arm 99 engages the beveled lower edge of the arm 137 and so moves the arm as to unlatch the operative engagement of the lug 135 with the shoulder 136 (see Fig. 46). The knob 130 is now free to make its normal downward and return movements, whereupon the shoulder 136 slips beneath the lug 135 and again locks the knob until the coin-controlled mechanism is next operated.

The improved machine of the invention is of relatively simple construction and substantially fool-proof in operation. Its characteristic advantage resides in the provision of a continuous strip of blank tickets that are consecutively advanced into printing relation with the printing mechanism and then appropriately printed and separated from the strip.

I have herein described and illustrated what I now consider the preferred construction of the machine. It will be understood, however, that numerous changes may be made in the operative elements, as well as in the sequence of operations, without departing from the spirit of the invention.

I claim:

1. In a weighing and ticket-printing machine having a weighing mechanism including a movable printing member responsive to weight, an impression member cooperating with said printing member, a holder for a continuous strip of tickets, mechanism for feeding said tickets into printing relation with said printing mechanism, ticket-cutting mechanism, coin-controlled means for actuating said impression member, and manually-controlled means for actuating said ticket cutting and ticket-feeding mechanisms and for restoring the impression member to its printing position out of contact with said printing member.

2. In a weighing and ticket-printing machine having a weighing mechanism including a printing member responsive to weight, an impression member cooperating with said printing member, and a movable printing ribbon, a holder for a continuous strip of tickets, mechanism for feeding said tickets into printing relation with said printing mechanism, ticket cutting mechanism, coin-controlled means for actuating said impression member and for moving said ribbon, and manually-controlled means for actuating said ticket-cutting and ticket-feeding mechanisms and for restoring the impression member to its printing position out of contact with said printing member.

3. In a weighing and ticket-printing machine having a weighing mechanism including a movable printing member responsive to weight, a printing mechanism including said printing member and a movable hammer, a holder for a continuous strip of tickets, mechanism for feeding said tickets into printing relation with said printing member and said hammer, ticket-cutting mechanism, coin-controlled means for actuating said hammer and thereby effecting a printing action of said member upon one of said tickets and for moving said ticket-cutting mechanism into position for cutting, and manually-controlled means for causing said ticket-feeding mechanism to advance another ticket into printing position and for actuating said cutting mechanism to cut off the printed ticket and for restoring said hammer to its initial position.

4. In a weighing and ticket-printing machine having a weighing mechanism including a movable printing member responsive to weight, a printing mechanism including said printing member, a holder for a continuous strip of tickets, mechanism for feeding said tickets into printing relation with said printing mechanism, ticket-cutting mechanism including a movable knife, coin-controlled means for actuating said printing mechanism and for moving said knife into position for cutting, and manually-controlled means for actuating said knife to cut off the printed ticket and for causing said ticket-feeding mechanism to advance another ticket into printing position.

5. In a weighing and ticket-printing machine having a weighing mechanism including a movable printing member responsive to weight, a printing mechanism including said printing member and a movable hammer, a holder for a continuous strip of tickets, mechanism for feeding said tickets into printing relation with said printing member and said hammer, ticket-cutting mechanism including a movable knife, coin-controlled means for actuating said hammer and thereby effecting a printing action of said member upon one of said tickets and for moving said knife into position for cutting, and manually-controlled means for causing said ticket-feeding mechanism to advance the printed ticket into position to be cut off and the next adjacent ticket into printing position and for actuating said knife to cut off the printed ticket.

6. In a weighing and ticket-printing machine having a weighing mechanism including a movable printing member responsive to weight, a printing mechanism including said printing member and a movable hammer, a holder for a continuous strip of tickets, mechanism for feeding said tickets into printing relation with said printing member and said hammer, ticket-cutting mechanism, a coin-controlled movable tripping member, means controlled by the forward movement of said tripping member for actuating said hammer to effect a printing action of said printing member upon one of said tickets, means for arresting the forward movement of said tripping member until the movement of the hammer is substantially completed, means whereby the resumed forward movement of said tripping member operates to place said ticket-cutting mechanism in position for cutting, and manually-controlled means for causing said ticket-feeding mechanism to advance the printed ticket into position to be cut off and the next adjacent ticket into printing position and for actuating the ticket-cutting mechanism to cut off the printed ticket and for restoring said hammer and tripping member to their initial positions.

7. In a weighing and ticket-printing machine having a weighing mechanism including a movable printing member responsive to weight, an impression member cooperating with said printing member, a holder for a continuous strip of tickets, mechanism for feeding said tickets into printing relation with said impression member, ticket-cutting mechanism, a coin-controlled movable tripping member, means controlled by the forward movement of said tripping member for first actuating said impression member and for then moving said ticket-cutting mechanism into position for cutting, and manually controlled means for appropriately advancing said strip of tickets and for actuating said ticket-cutting mechanism and for restoring said impression member and said tripping member to their respective initial positions.

8. In a weighing and ticket-printing machine having a weighing mechanism including a movable printing member responsive to weight, a printing mechanism including said printing member and a movable hammer, a holder for a continuous strip of tickets, mechanism for feeding said tickets into printing relation with said printing mechanism, ticket-cutting mechanism including a movable knife, a coin-controlled movable tripping member, means controlled by the forward movement of said tripping member for actuating said hammer to effect a printing action of said printing member upon one of said tickets, means for momentarily arresting the forward movement of said tripping member until the movement of the hammer is substantially completed, means whereby the resumed forward movement of said tripping member operates to move said knife into position for cutting, means whereby the movement of said knife into position for cutting withdraws said hammer from contact with the printed ticket, and manually-controlled means for causing said ticket-feeding mechanism to advance the printed ticket into position to be cut off and the next adjacent ticket into printing position and for actuating said knife to cut off the printed ticket and for restoring said hammer and tripping member to their respective initial positions.

9. In a weighing and ticket-printing machine having a weighing mechanism including a movable printing member responsive to weight, an impression member cooperating with said printing member, a holder for a continuous strip of tickets, mechanism for feeding said tickets into printing relations with said impression member, ticket-cutting mechanism including a movable knife, coin-controlled means for actuating said impression member and thereby effecting a printing action of said member upon one of said tickets and for moving said knife into position for cutting, latching means for holding the knife in position for cutting, and manually-controlled means for actuating said ticket-feeding mechanism and for restoring said impression member to its initial position and for tripping said latching means to permit said knife to cut off the printed ticket.

10. In a weighing and ticket-printing machine having a weighing mechanism including a movable printing member responsive to weight, an impression member cooperating with said printing member, a holder for a continuous strip of tickets, mechanism for feeding said tickets into printing relation with said impression member, ticket-cutting mechanism, coin-controlled means including a coin passage for actuating said impression member, manually-controlled means for actuating said ticket feeding and ticket-cutting mechanism and for restoring the impression member to its initial printing position, a movable closing member for said coin passage, means whereby said coin-controlled means causes said closing member to move to its closing position, and means whereby said manually-controlled means causes said closing member to move back and out of its closing position.

11. In a weighing and ticket-printing machine having a weighing mechanism including a movable printing member responsive to weight, a printing mechanism including said printing member and a movable hammer, a holder for a continuous strip of tickets, ticket-feeding mechanism, ticket-cutting mechanism including a movable knife, coin-controlled means for actuating said hammer to effect a printing action of said printing member upon one of said tickets and for moving said knife into position for cutting, means whereby the movement of said knife into position for cutting withdraws said hammer from contact with the printed ticket, and manually-controlled means for actuating said ticket-feeding and ticket-cutting mechanisms.

12. In a weighing and ticket-printing machine having a weighing mechanism including a movable printing member responsive to weight, a printing mechanism including said printing member, a continuous strip of tickets, ticket-feeding mechanism including a rotatable drum and driving means therefor, ticket-cutting mechanism, coin-controlled means for actuating said printing mechanism and for releasing the operative connection between said drum and its driving means, and manually-controlled means for restoring the operative connection between said drum and its driving means and for actuating the ticket-feeding and ticket-cutting mechanisms.

13. In a weighing and ticket-printing machine having a weighing mechanism including a movable printing member responsive to weight, a printing mechanism including said printing member, a continuous strip of tickets, ticket-feeding mechanism including a rotatable drum and driving means therefor, ticket-cutting mechanism, means for actuating said printing mechanism to effect a printing action of said printing member upon one of said tickets, means for releasing the operative connection between said drum and its driving means when the printing mechanism is actuated, and means for restoring the operative connection between said drum and its driving means and for actuating the ticket-feeding and ticket-cutting mechanisms.

14. In a weighing and ticket-printing machine having a weighing mechanism including a movable printing member responsive to weight, a printing mechanism including said printing member and a movable hammer, a continuous strip of tickets, mechanism for feeding the said tickets into printing relation with said printing member and said hammer, ticket-cutting mechanism including a movable knife, a coin-controlled movable tripping member, means controlled by the forward movement of said tripping member for actuating said hammer to effect a printing action of said printing member upon one of said tickets, means for arresting the forward movement of said tripping member until the movement of the hammer is substantially completed, means whereby the resumed forward movement of said tripping member operates to place said knife in position for cutting, means whereby the movement of said knife into position for cutting withdraws said hammer from contact with the printed ticket, and manually-controlled means for causing said ticket-feeding mechanism to advance the printed ticket into position to be cut off and the next adjacent ticket into printing position and for actuating the knife to cut off the printed ticket and for restoring said hammer and tripping member to their respective initial positions.

15. In a weighing and ticket-printing machine having a weighing mechanism including a movable printing member responsive to weight, a printing mechanism including said printing member, a continuous strip of tickets, mechanism for feeding said tickets into printing relation with said printing mechanism, ticket-cutting mechanism including a movable knife, means for actuating said printing mechanism and thereby effecting a printing action of said member upon one of said tickets and for moving said knife into position for cutting, latching means for holding the knife in position for cutting, and means for actuating said ticket-feeding mechanism and for tripping said latching means to permit said knife to cut off the printed ticket.

16. In a weighing and ticket-printing machine the combination of a weighing mechanism having a movable printing member responsive to weight, an impression member cooperating therewith, a holder for a continuous strip of tickets, mechanism for feeding said tickets into printing relation with said printing member, a cutting mechanism for severing tickets from said strip, a main actuating member for actuating said impression member, said feeding mechanism and said cutting mechanism, said actuating member operating to move said impression member to its inoperative position and storing energy therein, and coin-controlled means for releasing said impression member to print said ticket.

17. In a weighing and ticket-printing machine the combination of a weighing mechanism having a movable printing member responsive to weight, an impression member cooperating therewith, a holder for a continuous strip of tickets, mechanism for feeding said tickets into printing relation with said printing member, a cutting mechanism for severing tickets from said strip, a main actuating member for actuating said feeding mechanism and said cutting mechanism and for moving said impression member to its inoperative position, a printing ribbon, a feed mechanism therefor, means for actuating said ribbon feed mechanism when said impression member is in inoperative position, and coin-controlled means for actuating said impression member to print said ticket.

18. In a weighing and ticket printing machine the combination of a weighing mechanism having a movable printing member responsive to weight, an impression member cooperating therewith, a holder for a continuous strip of tickets, mechanism for feeding said tickets into printing relation with said printing member, a cutting mechanism for severing tickets from said strip, a main actuating member for actuating said impression member, said feeding mechanism and said cutting mechanism, said actuating member operating to move said impression member to its inoperative position and storing energy therein, a latch for holding said impression member in its inoperative position and coin-controlled means for releasing said latch.

19. In a weighing and ticket printing machine the combination of a weighing mechanism having a movable printing member responsive to weight, an impression member cooperating therewith, a holder for a continuous strip of tickets, mechanism for feeding said tickets into printing relation with said printing member, a cutting mechanism for severing tickets from said strip, a main actuating member for actuating said feeding mechanism and said cutting mechanism and for moving said impression member to its inoperative position, a printing ribbon, a feed mechanism therefor, means for actuating said mechanism when said impression ribbon feed mechanism when said impression member is in inoperative position, a latch for holding said impression member in its inoperative position and coin-controlled means for releasing said latch.

20. In a weighing and ticket-printing machine, the combination of a weighing mechanism having a movable printing member responsive to weight, an impression hammer cooperating therewith, a holder for a continuous strip of tickets, mechanism for feeding said tickets in printing relation with said printing member, a reciprocatory main actuating member, connections between said actuating member and said feed mechanism for effecting the feed of said ticket on movement of said actuating member in one direction, a coin-controlled mechanism for releasing said impression hammer, and connections whereby said actuating member cannot be moved until said hammer operates.

21. In a weighing and ticket-printing machine, the combination of a weighing mechanism having a movable printing member responsive to weight, an impression hammer cooperating therewith, a holder for a continuous strip of tickets, mechanism for feeding said tickets in printing relation with said printing member, a reciprocatory main actuating member, connections between said actuating member and said feed mechanism for effecting the feed of said ticket on movement of said actuating member in one direction, a coin-controlled mechanism for releasing said impression hammer, connections whereby said actuating member cannot be moved until said hammer operates, and means actuated by said hammer for rendering said actuating member operative.

22. In a weighing and ticket-printing machine the combination of a weighing mechanism having a movable printing member responsive to weight, an impression member cooperating therewith, mechanism for feeding tickets into printing relation with said printing member and delivering said printed tickets therefrom, a coin-controlled mechanism for actuating said impression member to print said ticket, and means for rendering said coin-controlled mechanism inoperative for a second operation until the completion of the immediately preceding operation of printing and delivering said ticket and the restoration of the parts for such second complete operation.

23. In a weighing and ticket-printing machine the combination of a weighing mechanism having a movable printing member responsive to weight, an impression member cooperating therewith, mechanism for feeding tickets into printing relation with said printing member and delivering said printed tickets therefrom, a coin-controlled mechanism for actuating said impression member to print said tickets, actuating devices for said ticket-feeding and delivering mechanism, means operative upon the insertion of a coin for rendering said coin-controlled mechanism inoperative for a second operation, and means operated by a part of the actuating mechanism of said ticket-feeding and delivering means for restoring said coin-controlled mechanism to operative condition.

In testimony whereof I affix my signature.

GUSTAV F. HOCHRIEM.

CERTIFICATE OF CORRECTION.

Patent No. 1.736,284.

Granted November 19, 1929, to

GUSTAV F. HOCHRIEM.

It is hereby certified that error appears in the printed specification of the above numbered patent requiring correction as follows: Page 8, lines 84, 100, 118 and 119, claims 12, 13 and 14, and page 9, line 19, claim 15, before the words "a continuous" insert the words "a holder for"; and that the said Letters Patent should be read with these corrections therein that the same may conform to the record of the case in the Patent Office.

Signed and sealed this 24th day of December, A. D. 1929.

actuating member and said feed mechanism for effecting the feed of said ticket on movement of said actuating member in one direction, a coin-controlled mechanism for releasing said impression hammer, connections whereby said actuating member cannot be moved until said hammer operates, and means actuated by said hammer for rendering said actuating member operative.

22. In a weighing and ticket-printing machine the combination of a weighing mechanism having a movable printing member responsive to weight, an impression member cooperating therewith, mechanism for feeding tickets into printing relation with said printing member and delivering said printed tickets therefrom, a coin-controlled mechanism for actuating said impression member to print said ticket, and means for rendering said coin-controlled mechanism inoperative for a second operation until the completion of the immediately preceding operation of printing and delivering said ticket and the restoration of the parts for such second complete operation.

23. In a weighing and ticket-printing machine the combination of a weighing mechanism having a movable printing member responsive to weight, an impression member cooperating therewith, mechanism for feeding tickets into printing relation with said printing member and delivering said printed tickets therefrom, a coin-controlled mechanism for actuating said impression member to print said tickets, actuating devices for said ticket-feeding and delivering mechanism, means operative upon the insertion of a coin for rendering said coin-controlled mechanism inoperative for a second operation, and means operated by a part of the actuating mechanism of said ticket-feeding and delivering means for restoring said coin-controlled mechanism to operative condition.

In testimony whereof I affix my signature.

GUSTAV F. HOCHRIEM.

CERTIFICATE OF CORRECTION.

Patent No. 1,736,284.

Granted November 19, 1929, to

GUSTAV F. HOCHRIEM.

It is hereby certified that error appears in the printed specification of the above numbered patent requiring correction as follows: Page 8, lines 84, 100, 118 and 119, claims 12, 13 and 14, and page 9, line 19, claim 15, before the words "a continuous" insert the words "a holder for"; and that the said Letters Patent should be read with these corrections therein that the same may conform to the record of the case in the Patent Office.

Signed and sealed this 24th day of December, A. D. 1929.